(12) United States Patent
Reinders

(10) Patent No.: US 7,775,064 B2
(45) Date of Patent: Aug. 17, 2010

(54) EVAPORATIVE COOLER

(75) Inventor: Johannes Antonius Maria Reinders, Warnsveld (NL)

(73) Assignee: Oxycom Beheer B.V., Raalte (NL)

( * ) Notice: Subject to any disclaimer, the term of this patent is extended or adjusted under 35 U.S.C. 154(b) by 0 days.

(21) Appl. No.: 10/546,836

(22) PCT Filed: Feb. 26, 2004

(86) PCT No.: PCT/EP2004/001927

§ 371 (c)(1),
(2), (4) Date: Aug. 25, 2005

(87) PCT Pub. No.: WO2004/076931

PCT Pub. Date: Sep. 10, 2004

(65) Prior Publication Data

US 2006/0070390 A1   Apr. 6, 2006

(30) Foreign Application Priority Data

Feb. 27, 2003   (NL) .................................. 1022799

(51) Int. Cl.
*F28D 5/00* (2006.01)
(52) U.S. Cl. .......................................... 62/310; 62/394
(58) Field of Classification Search ................. 62/271, 62/259.4, 310, 305, 394, 506, 171, 121; 261/97, 106, 24, 26, 29, 103; 165/115, 911; 239/379
See application file for complete search history.

(56) References Cited

U.S. PATENT DOCUMENTS

| | | | |
|---|---|---|---|
| 3,290,866 A * | 12/1966 | Schonrock | 96/265 |
| 3,583,174 A * | 6/1971 | Logue | 62/309 |
| 3,683,591 A | 8/1972 | Ola | |
| 4,156,351 A * | 5/1979 | Schlom et al. | 62/121 |
| 4,158,679 A | 6/1979 | Yeagle | |
| 4,201,262 A * | 5/1980 | Goldstein | 165/117 |
| 4,419,300 A | 12/1983 | VanNess et al. | |
| 4,479,366 A * | 10/1984 | Lanier et al. | 62/304 |
| 4,612,778 A * | 9/1986 | Medrano | 62/311 |
| 4,657,709 A | 4/1987 | Goettl | |
| 4,674,295 A | 6/1987 | Curtis, Sr. | |
| 4,994,211 A | 2/1991 | Fuller | |
| 5,003,789 A * | 4/1991 | Gaona et al. | 62/304 |
| 5,349,829 A | 9/1994 | Tsimerman | |
| 5,377,500 A * | 1/1995 | Yang | 62/238.6 |
| 5,444,986 A * | 8/1995 | Hino | 62/66 |

(Continued)

FOREIGN PATENT DOCUMENTS

BE   1013160 A   10/2001

(Continued)

*Primary Examiner*—Mohammad M Ali
(74) *Attorney, Agent, or Firm*—David P. Owen; Coraline J. Haitjema; Howrey LLP

(57) ABSTRACT

The invention relates to an evaporative cooler having two medium circuits which are thermally coupled to one another by a number of heat-conducting vertical walls. These walls and the heat-conducting fins arranged thereon are provided with a hydrophilic, water-buffering covering layer, for example made from Portland cement. A humidification unit for moistening the covering layer is added to the dew point cooler. According to the invention, the humidification unit comprises a releasable cover which forms part of the casing of the dew point cooler and bears at least one sprinkler or nozzle for distributing water over the covering layer.

23 Claims, 8 Drawing Sheets

U.S. PATENT DOCUMENTS

Figure 1:
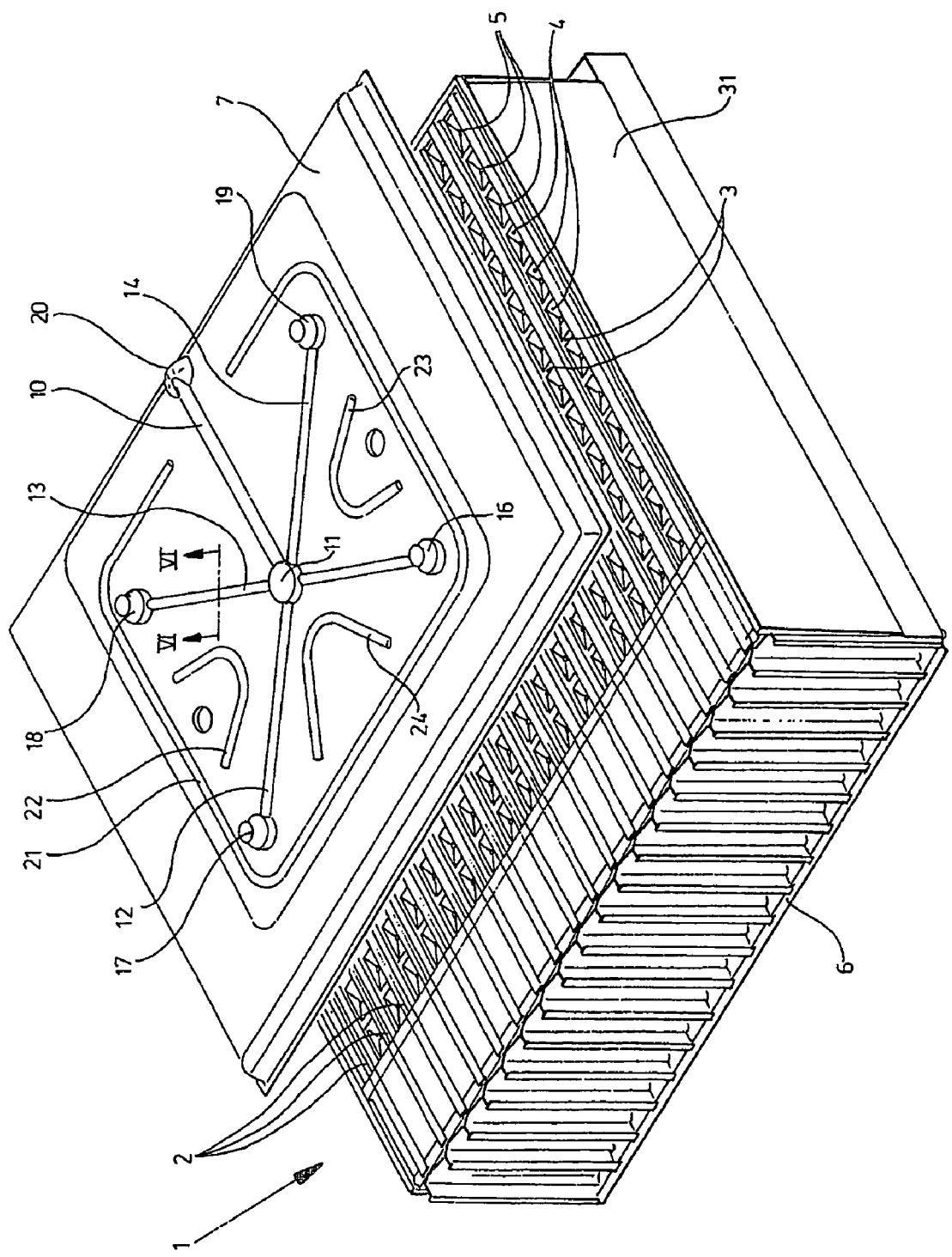

| | | | |
|---|---|---|---|
| 5,606,868 A * | 3/1997 | Calvert | 62/315 |
| 5,720,407 A | 2/1998 | Hoffman | |
| 5,851,444 A * | 12/1998 | Hansell et al. | 261/106 |
| 5,857,350 A * | 1/1999 | Johnson et al. | 62/314 |
| 5,919,406 A | 7/1999 | Bachofen | |
| 5,946,932 A * | 9/1999 | Wang | 62/305 |
| 5,971,366 A | 10/1999 | Smith | |
| 5,971,370 A | 10/1999 | Galabinski | |
| 6,102,994 A * | 8/2000 | Zhou et al. | 106/15.05 |
| 6,332,332 B1 | 12/2001 | O'Brien | |
| 6,338,257 B1 * | 1/2002 | Chiu et al. | 62/305 |
| 6,338,258 B1 | 1/2002 | Lee et al. | |
| 6,463,751 B1 * | 10/2002 | Teller | 62/305 |
| 6,497,107 B2 * | 12/2002 | Maisotsenko et al. | 62/121 |
| 6,748,759 B2 * | 6/2004 | Wu | 62/305 |
| 6,854,278 B2 * | 2/2005 | Maisotsenko et al. | 62/94 |
| RE39,288 E * | 9/2006 | Assaf | 62/94 |
| 2004/0226698 A1 | 11/2004 | Reinders | |

FOREIGN PATENT DOCUMENTS

| | | | |
|---|---|---|---|
| DE | 1100053 B | | 2/1961 |
| FR | 1489861 A | | 7/1967 |
| FR | 1581810 A | | 9/1969 |
| JP | 2000-283512 A | * | 10/2000 |
| NL | 1018735 C | | 2/2003 |
| WO | WO 99/41552 A | | 8/1999 |
| WO | WO-02/27254 A | | 4/2002 |
| WO | WO 03/091633 A | | 11/2003 |

* cited by examiner

EVAPORATIVE COOLER

BACKGROUND OF THE INVENTION

1. Field of the Invention

The present invention relates to an evaporative cooler and more particularly to an evaporative cooler having an improved irrigation system. It also relates to a method of supplying liquid to an evaporative cooler.

2. Description of the Related Art

Evaporative coolers are known in which a supply of liquid is provided to a porous panel. An air stream passing through the panel can evaporate this liquid. In doing so, the temperature of the air decreases and its humidity is increased. In such prior art devices, the liquid, generally water, was supplied in quantities sufficient to maintain the wettable surface completely saturated. Excess water was allowed to drip away or would be recycled for reuse. Such a device is known from U.S. Pat. No. 6,332,332, which discloses a water distribution tray with an inlet and a series of water outlets. Evaporative coolers of this type have been found to be very inefficient in significantly lowering the temperature of the air stream.

Other evaporative coolers are known in which a primary flow of air on a first side of a heat exchanger is cooled by evaporation of a liquid into a secondary flow of air on a second side of the heat exchanger. An important consideration in such coolers is the supply of liquid for evaporation. One such device is disclosed in PCT publication WO 99/41552, which includes spray means for spraying finely divided fluid onto the walls of a secondary canalization.

It has been found however that nebulization, or spraying finely divided fluid, into the flow channels has a number of disadvantages. From a functional perspective, the presence of liquid droplets in the air stream reduces the capacity of the air stream to evaporate further liquid from the heat exchanger itself. This reduces the cooling effect on the primary flow and considerably reduces the efficiency of the system. Of perhaps greater importance, the According to an alternative embodiment disclosed in PCT publication WO 99/41552, a pipe system may be used for supplying fluid directly to an absorbent or hygroscopic coating on the heat exchanger. It has however been found that hygroscopic coatings tend to exert excessive retention on the liquid and reduce its ability to evaporate. Additionally, a pipe system capable of evenly distributing liquid over the whole area of the heat exchanger is complicated and the liquid flow from the individual pipe outlets is difficult to control.

BRIEF SUMMARY OF THE INVENTION

According to the present invention, there is provided an evaporative cooler comprising a wettable heat exchange surface and an irrigation system. The irrigation system comprises a spraying device for distributing the irrigation liquid over a distribution area; and a drop forming device for forming a plurality of drops from the distributed liquid and supplying the drops to the wettable heat exchange surface. This combination of spraying followed by drop forming has been found especially effective in preventing aerosol formation in the heat exchanger. In this manner, transmission of diseases such as Legionnaire's disease may be avoided and the air in the region of the heat exchanger does not become saturated with nebulized water.

It should be noted that in the present context, reference to drops is understood to refer to drops of liquid that are not airborne under the conditions prevailing within the cooler. Reference to droplets is intended to refer to liquid particles of such dimensions that they may be carried in the air stream passing through the cooler. In particular, droplets in the size range of from 1 to 5 microns have been shown to be undesirable since such droplets are both sufficiently large to carry Legionella bacteria and sufficiently small to be inhaled deep into the lungs where they can cause Legionnaire's disease.

A further advantage of the combination of spraying and drop formation is that the distribution of the irrigation liquid over the distribution area can be carefully controlled. It has been found advantageous in evaporative coolers that liquid is intermittently supplied to the heat exchange surface. In particular, during watering and shortly thereafter, the efficiency of the cooler drops and the outlet temperature rises. This effect is believed to be due to increased saturation of the air flowing over the heat exchanger despite the above mentioned reduction of droplet and aerosol formation. By spraying intermittently with sufficient water to irrigate the wettable heat exchange surface and then ceasing spraying, the efficiency and outlet temperature of the cooler rapidly return to their steady state value.

Accordingly, a method of wetting a heat exchange surface of an evaporative cooler with an evaporable liquid is also disclosed, comprising supplying the liquid to a generally closed distribution area, and delivering the liquid to the heat exchange surface in an intermittent manner substantially without nebulization. Preferably, the intermittent delivery takes place during an actuation period in which the liquid delivery to the heat exchange surface is abruptly started and stopped. In this way the water is delivered in the manner of an impulse function or a square wave. The design of the irrigation system according to the present invention facilitates such abrupt control of delivery.

Advantageously, the drop forming device comprises a tray having a plurality of openings. The tray may be provided with a plurality of recesses, with the openings being located at the lowest points of the recesses. Such a structure has been found extremely practical and cheap to produce using e.g. plastic moulding techniques. In this context it should be noted that although reference is made to a drop forming device, the device may in fact deliver the liquid in a steady stream or directly by contact to the heat exchange surface. Reference to a drop forming device in the following is intended to include such alternatives to the extent that they do not lead to droplet or aerosol formation.

Preferably, the distribution area is located over the tray and may be a substantially closed volume. The volume may be closed except for a liquid inlet to the spray device and the openings for formation of drops. In this manner, egress of droplets or aerosols of irrigation liquid from the distribution area is substantially prevented and only drops greater than a given size are formed. Preferably, the openings are sized to form drops of greater than 1 mm diameter.

In order to achieve uniform and controllable distribution of liquid within the distribution area the spraying device preferably comprises a rotary spray head. The spray head may be caused to rotate by connection to a supply of pressurized liquid or by other appropriate means.

Figure 7:
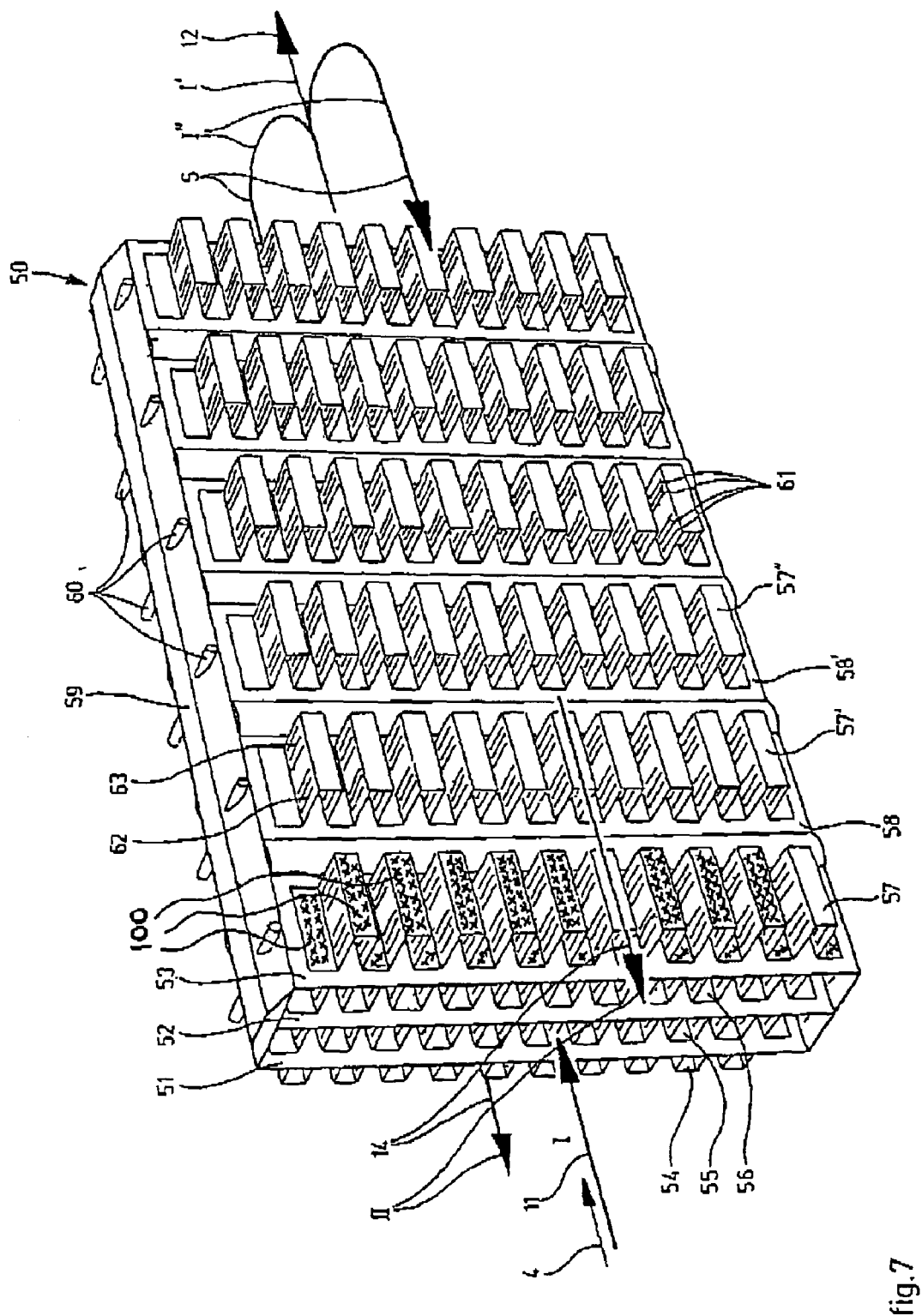
Figure 8:
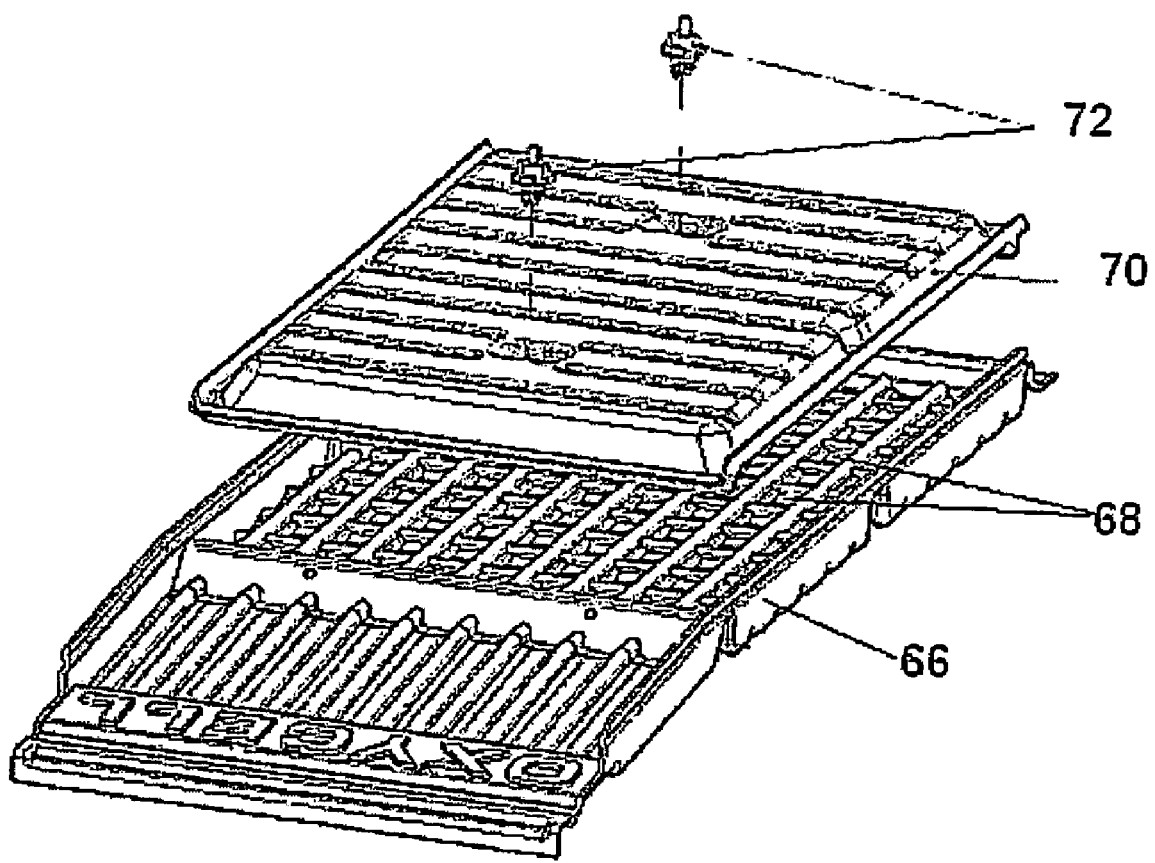

In one particular embodiment of the invention there is provided an evaporative cooler, comprising:
 a first medium circuit and a second medium circuit, which is thermally coupled to the first medium circuit via a number of at least partially heat-conducting, substantially vertical walls, through which two circuits two respective media can flow in counterflow, at least the second medium containing a gas, for example air, with a relative humidity of less than 100%;

which heat-conducting walls have break-up means for breaking up at least the thermal boundary layer, the laminar boundary layer and the relative humidity boundary layer at the location of zones which are active at least for heat transfer in at least the primary medium, which break-up means comprise heat-conducting projections which increase the size of the effective heat-conducting surface area of the wall;

the heat-conducting surfaces of the walls and the break-up means, at least in the region of the secondary medium, being at least partially covered with a hydrophilic, covering layer, which covering layer is, for example, porous and/or can absorb an evaporable liquid, for example water, through capillary action, can retain this liquid and then release it again through evaporation, in such a manner that the moistened covering layer and as a result also the heat-conducting surfaces and the break-up means are cooled;

which covering layer consists of a porous, technical-grade ceramic material, for example a fired layer, a cement such as a Portland cement, or a fibrous material, for example a mineral wool, such as rock wool;

primary drive means, for example a fan or pump, based on pressure difference for the primary medium;

secondary drive means, for example a fan, based on pressure difference for the secondary medium;

a housing with primary and secondary medium inlets and outlets;

an irrigation unit for subjecting the secondary medium to humidification by the evaporable liquid by evaporation of liquid from the covering layer, in such a manner that the evaporated liquid entrained by the secondary medium extracts heat from the primary medium via the heat-conducting walls; and which irrigation unit comprises a removable cover which forms part of the casing and bears at least one sprinkler or nozzle which is positioned at a distance above the top edges of the walls for distributing water onto the covering layer on the walls and the break-up means substantially without droplet formation, which at least one sprinkler receives pressurised water via at least one water feed line. Such an evaporative cooler is sometimes referred to as a dew point cooler since in operation the primary air exits at a temperature close to its dew point.

According to a further aspect of the invention, the cooler is simplified by providing the irrigation unit as a removable cover which is able to cover the remaining housing. Removal of the cover makes the interior of the dew point cooler accessible and means that it is possible, for example, to perform servicing work, such as inspection of the interior, replacement of heat-exchanging walls with fins, spraying the interior of the dew point cooler for cleaning purposes, and the like.

The use of a covering layer consisting of a porous technical-grade ceramic material is important in order to ensure that it is always possible for a sufficiently large quantity of water to be evaporated in the secondary medium stream without dry sections forming in the covering layer, which could reduce the efficiency of the dew point cooler. It will be clear, that suitable control of the supply of the water stream is a prerequisite in this respect. This feed may be continuous or intermittent.

One constructional embodiment has the particular feature that funnels are located in the regions between the top edges of adjacent walls, these funnels receiving the water received from the at least one sprinkler and passing it on to the covering layer on the respective walls and the break-up means. In this way, it is possible to achieve the separation between the at least one sprinkler and the effective space in which the evaporation takes place. The physical separation via the funnels of the sprinkler space and the evaporation spaces of the dew point cooler prevents atomisation into the evaporation space of the water released by the sprinkler or sprinklers, which could reduce the efficiency of the dew point cooler. This is because atomisation would have the undesirable result that evaporation and associated cooling would take place not at the wall but rather in the corresponding space, which is to the detriment of cooling of the primary medium which is to be cooled. Diffusion of Legionella carrying droplets is also prevented.

The dew point cooler with the said funnels preferably has the particular feature that the funnels are formed as modelled strips having a number of funnels, which may be releasably connected to opposite top edges of the heat-conducting walls.

This latter embodiment may advantageously be designed in such a manner that each strip forms a monolithic unit with a wall or two adjacent walls.

The latter two variants may have the characteristic feature that the strips, and if appropriate the associated wall or walls consist of plastic and are formed by thermoforming, vacuum-forming, injection-moulding or the like.

In order, in particular in the case of relatively large heat exchangers, to achieve a good homogeneity of the irrigation of the covering layers with water, the dew point cooler may advantageously comprise: a number of sprinklers which are connected to the at least one water feed line via an individual water feed line which is added to each sprinkler, for example via a manifold.

A variant in which the cover comprises two modelled plates which are placed on top of one another and are connected to one another, which plates delimit a passage which forms the water feed line and if appropriate a manifold, can be realised very practically and inexpensively.

The sprinklers may be of a stationary type, in which case some atomisation, which is to be considered parasitic, may occur. It is preferable for the dew point cooler according to the invention to have the characteristic feature that the sprinklers are of the type which rotate during operation.

In a further embodiment, the dew point cooler has the particular feature that the housing comprises a base which has discharge means for excess water. By measuring the quantity of excess water, for example using a level detector, it is possible to effectively control the water supply, in such a manner that a dynamic equilibrium is established within given tolerances.

BRIEF DESCRIPTION OF THE DRAWINGS

An embodiment of the present invention will now be described, by way of example only, having reference to the accompanying figures, in which:

FIG. 1 shows a perspective view of a dew point cooler according to the invention, with the cover comprising sprinklers shown a certain distance above the dew point cooler;

FIG. 2 shows a perspective view of the dew point cooler with the cover positioned thereon;

FIG. 3 shows a perspective view from the other side of the dew point cooler shown in FIG. 2;

FIG. 4 shows a perspective view from below of the base of the dew point cooler with upright walls formed thereon;

FIG. 5 shows a side view of the dew point cooler in the situation illustrated in FIGS. 2 and 3;

FIG. 6 shows a cross section VI-VI from FIG. 1 on an enlarged scale;

FIG. 7 shows a perspective view of part of the interior of a dew point cooler in another embodiment of the invention; and FIG. 8 shows an exploded perspective view of an alternative embodiment of an irrigation system.

DESCRIPTION OF ILLUSTRATIVE EMBODIMENTS

FIG. 1 shows a dew point cooler 1 comprising two medium circuits through which, as will be explained below with reference to FIG. 7, a medium, in particular air, can flow in counterflow. The dew point cooler 1 comprises a number of heat-conducting and medium-separating walls 2, which are used for heat transfer between the primary air stream and the secondary air stream, with the media remaining separate. In this context, for explanation reference should be made to FIG. 7.

As can be seen in particular from FIG. 7, the walls bear copper or aluminium strips which are bent in the shape of square waves, serve as effective features for increasing the surface area and can be considered as fins 54, 55, 56, 57. These fins are at least partially provided with a porous covering layer 100, for example consisting of rock wool or a Portland cement. This means that this covering layer 100 is able to retain water which is supplied, for example through capillary action, and to distribute it.

With a view to the latter function, plastic strips 3 are located on the top side of the walls 2, which strips have acquired the shape shown in FIG. 1, for example through thermoforming, comprising a row of funnel-like recesses 4 with water-passage openings 5 at the underside.

As can be seen clearly from FIG. 1, the entire dew point cooler is provided with regularly and homogenously distributed funnels on its top side in this way. At the underside of the dew point cooler 1 there is a base 6, the structure and function of which will be explained in more detail in particular with reference to FIGS. 4 and 5.

Figure 6:
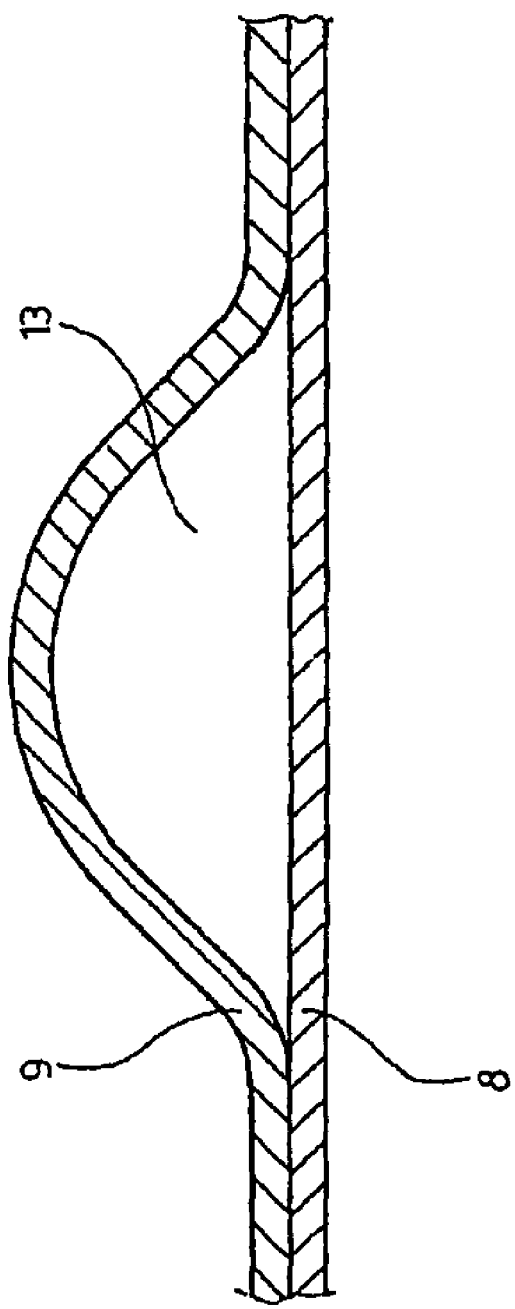

The dew point cooler can be covered by means of a cover 7. The cover 7 is composed of two modelled thermoplastic plates 8, 9 placed on top of one another (cf. also FIG. 6), which are modelled and attached to one another so as to leave clear a number of water feed lines, namely a common main water feed line 10 and four individual water feed lines 12, 13, 14, 15 which are connected to the main water feed line 10 via a manifold 11 and feed water, which is supplied under pressure via line 10, to four rotating sprinklers 16, 17, 18, 19, respectively. A water pipe is connected to the water feed line 10 via a connection 20 by means of a quick-coupling system which is known per se.

It should be noted that the cover 7 is also provided with reinforcing ribs 21, 22, 23, 24.

When pressurised water is admitted to line 10, this water is sprayed out sideways by the sprinklers, towards the underside of the cover, so as to supply water more or less homogeneously to the recesses 4. The water which is collected as a result is then allowed to pass through the openings 5 in dropwise fashion to the space below, where it is able to wet the covering layer on the heat-exchanging walls and the fins. Excess water is collected at the underside by the base 6 and drained away via a central drain 25.

The recesses 4 and openings 5 are sized to collect the sprayed water allowing drops to pass through but preventing transmission of tiny droplets. In particular, the openings may be sized to allow drops of greater than 1 mm to form. Preferably, droplets in the range of 1 to 5 microns, which could possibly transport Legionella bacteria, are prevented from passing through the opening 5 by the formation of the larger drops.

Figure 2:
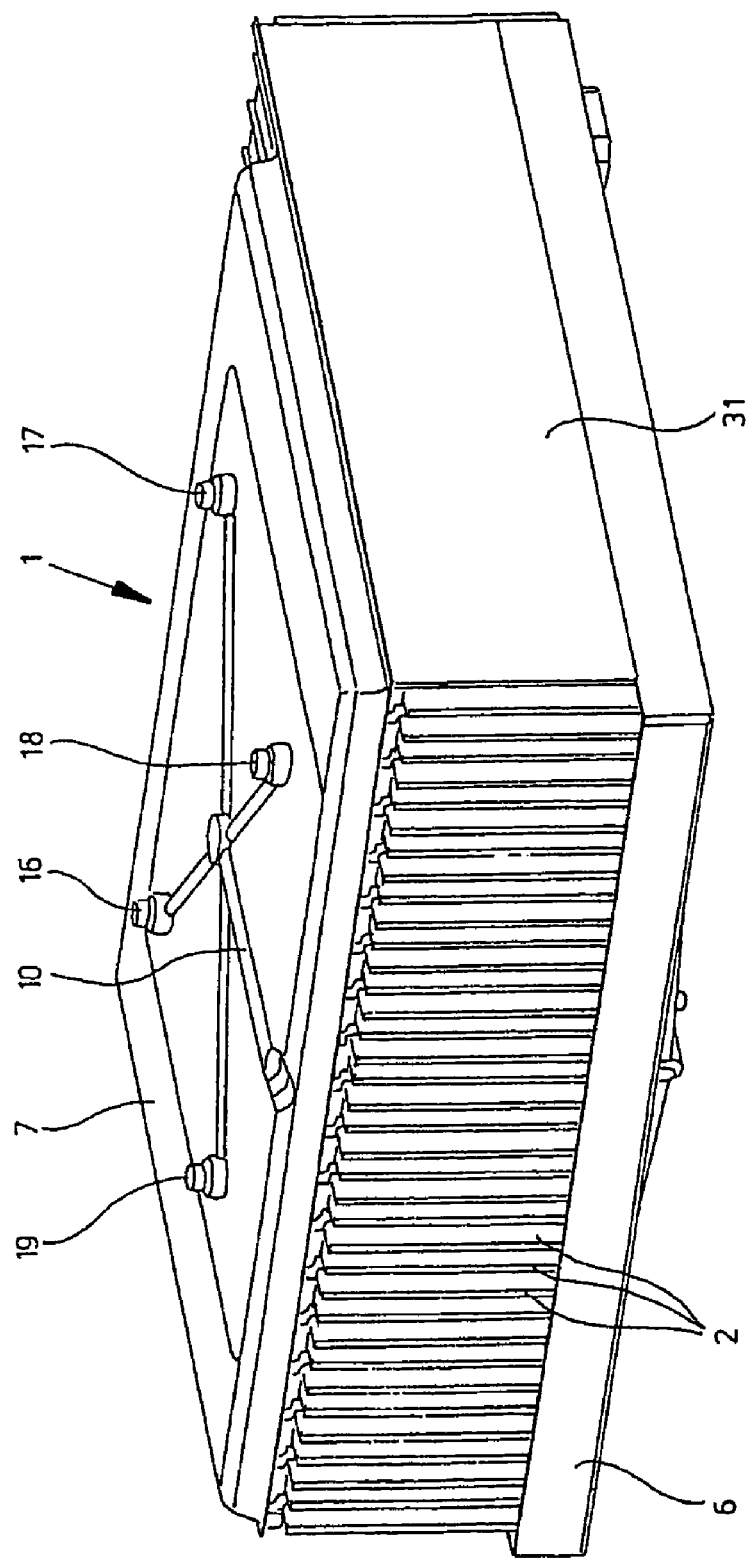

FIG. 2 shows the dew point cooler 1 in its closed state, in which the cover 7 is positioned in such a manner that it substantially interacts in a sealing manner with the base 6.

Figure 4:
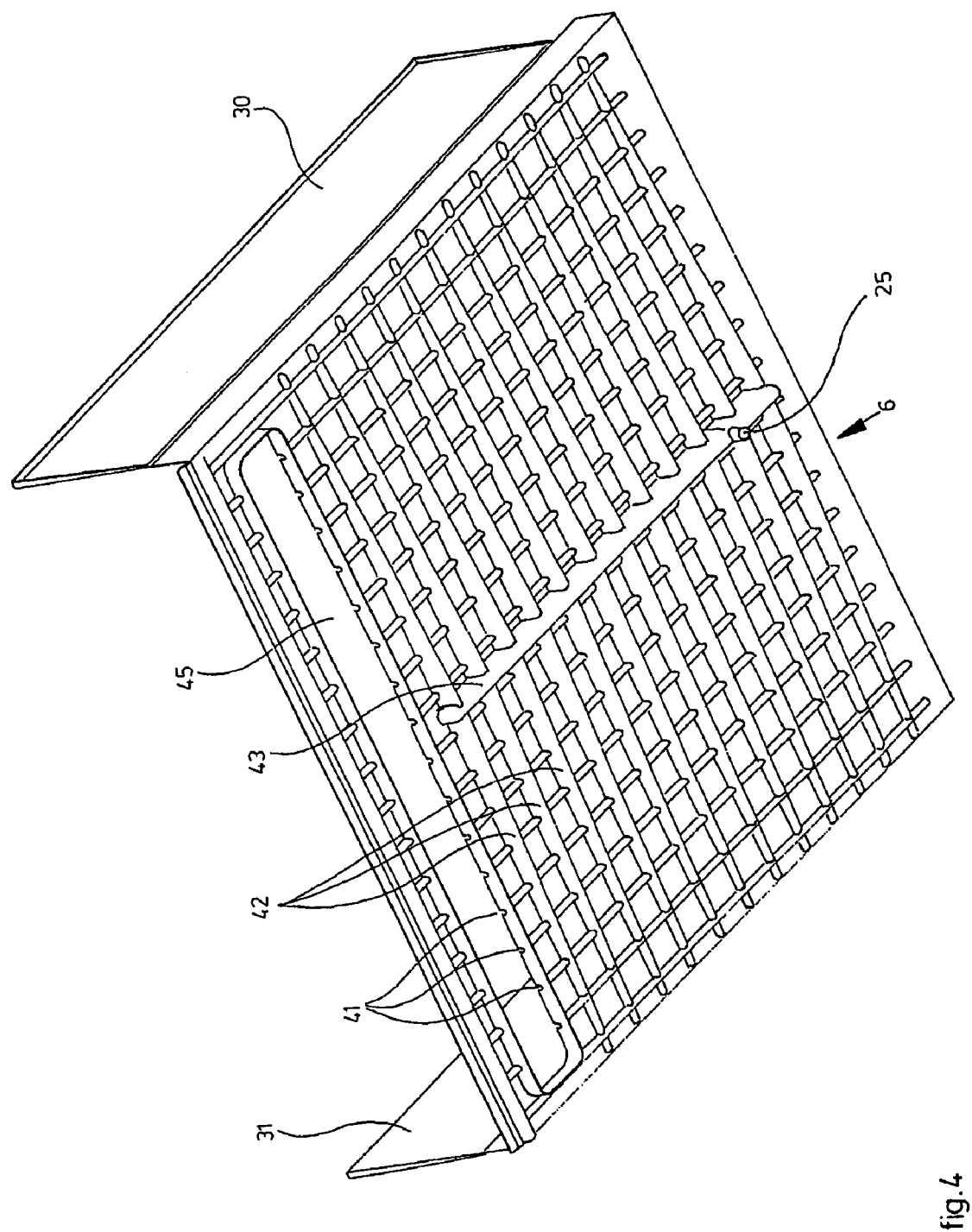

As can be seen in FIG. 4, two side panels 30, 31 are fitted to the base 6. At the two open ends of the dew point cooler, the interior of the dew point cooler is visible, since manifolds which are known per se and are used to couple the primary medium passages and the secondary medium passages to one another to form the respective primary and secondary medium inlets and outlets have been omitted from the drawing. In the case of the dew point cooler according to the invention, use will generally be made of a configuration as shown in FIG. 7, in which the secondary air stream is branched off from the primary air stream which is to be cooled, for example in a ratio of 30%:100%, with the result that 70% of the primary air stream is discharged as cooled air stream. This is an aspect to which the present invention does not inherently relate. This aspect is only of importance with a view to determining the efficiency of the dew point cooler and the nature and shape of the abovementioned manifold. For example, the dew point cooler in accordance with the principle outlined in FIG. 7 does not have an external feed for a secondary air stream, since the latter is, after all, branched off internally from the primary air stream at the end of its passage through the dew point cooler.

Figure 3:
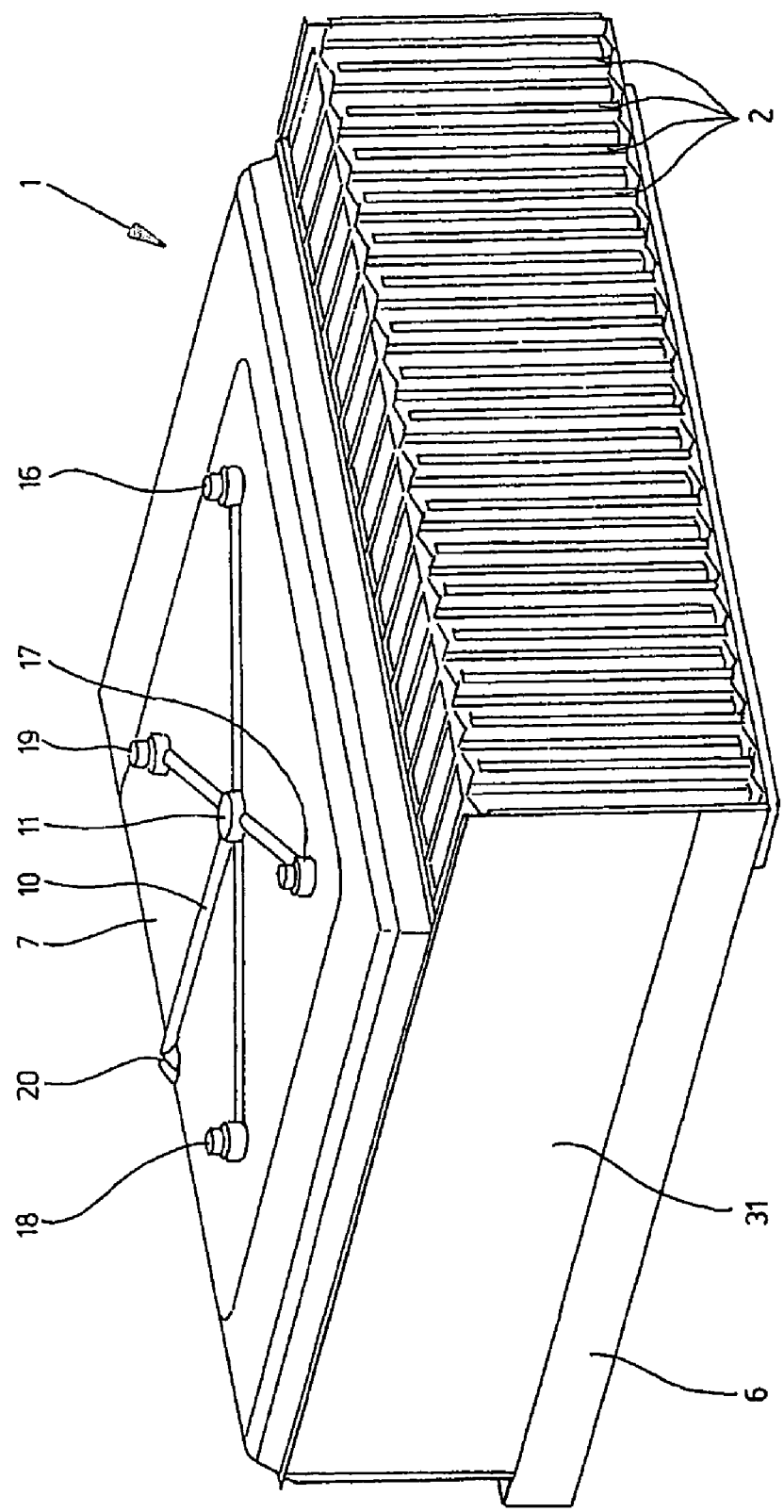

FIG. 3 shows a view of the dew point cooler 1 from the other side.

FIG. 4 shows the base 6. The latter, together with the side panels 30, 31, is formed integrally from a thermoplastic material. The heat-exchanging walls 2 are supported and positioned in recesses 41 and channels 42 which run downwards towards the centre and collect excess water which drips down, passing it to a central drainage channel 43 with the drainage opening 25.

Figure 5:
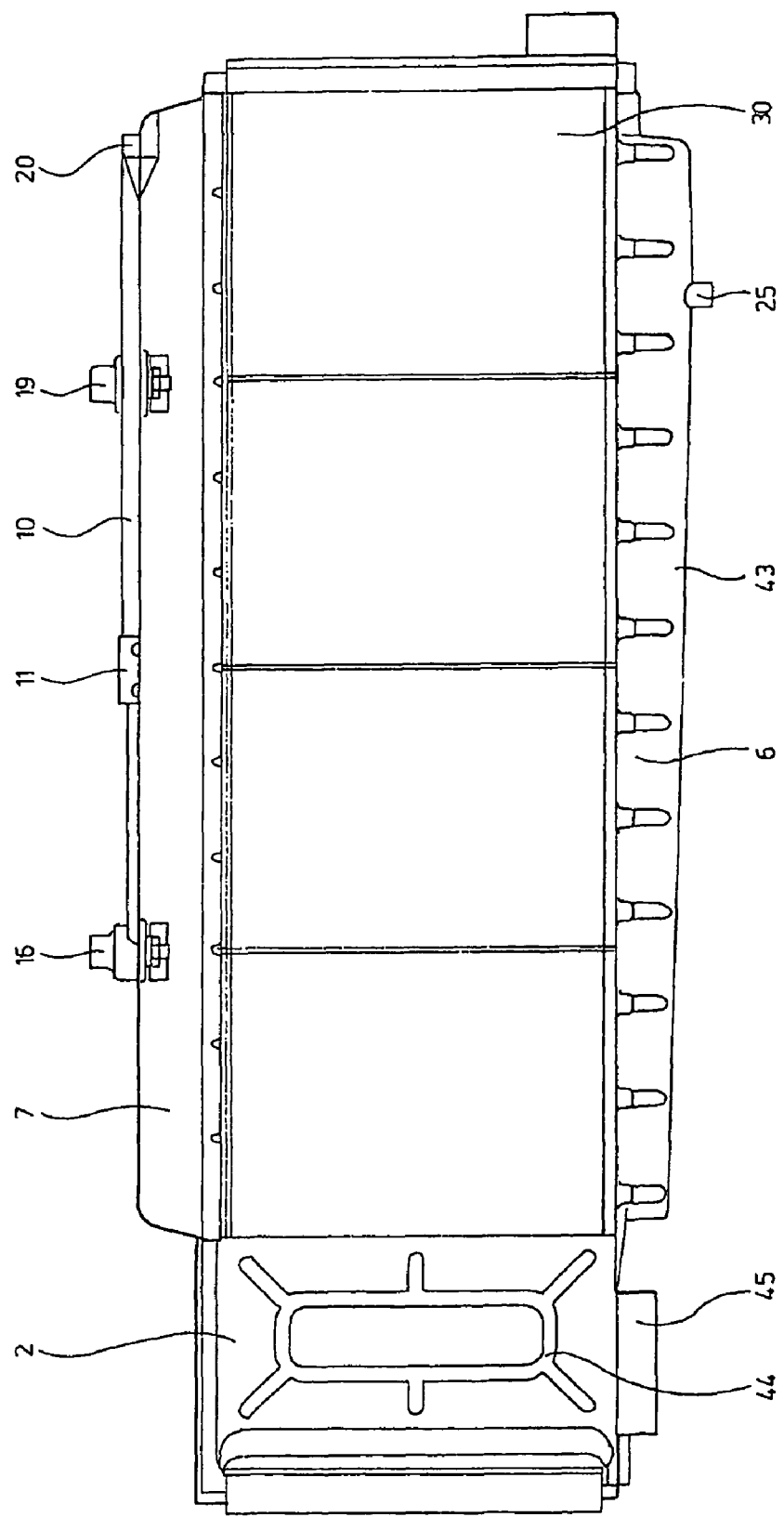

FIG. 5 shows that the heat-exchanging walls 2 are provided at their ends with a reinforcing profile 44 and that incoming and outgoing air can pass through via the opening 45 shown in FIG. 4.

FIG. 7 shows a dew point cooler 50, the casing of which has been omitted for the sake of clarity. The dew point cooler in this greatly simplified illustration comprises three heat-conducting and medium-separating walls 51, 52, 53, on either side of which there are respective fins 54, 55, 56, 57 which extend in the form of zigzag-shaped strips in the transverse direction with respect to the streams which are to be described below. In the directions of flow, the fins are of a limited length, while the said walls 51, 52, 53 conduct heat in the region of fins and have heat-insulating parts 58, 58' between the respective strips of fins, which are denoted by 57, 57', 57''. This prevents heat transfer in the longitudinal direction, and consequently the exchanger 50 has an excellent efficiency.

The middle two of the four passages shown correspond to the primary circuit I. The outermost two passages, which are also delimited by the housing (not shown), define the secondary circuit II. The various streams and circuits are denoted by the same reference numerals as in FIG. 2.

The dew point cooler 50 of FIG. 7 comprises an alternative irrigation device having a removable central water feed line 59 with drop outlets 60 for wetting the fins 54-57, which are provided with a covering layer of Portland cement. The fins have perforations, with the result that the water coming out of the drop outlets 60 can also wet all of the fins located at a lower level. Any excess water is discharged through means which are not shown. As can be seen from the figure, the perforations 61 are designed as slots. These slots are not stamped out but rather are formed by the formation of incisions in a stamping machine and pressing the fin material out of the main plane of the surrounding surface, in such a manner that a louvred structure is formed. The shape of the perforations 61 which can therefore be referred to as louvres, is such that they are grouped into two groups of louvres which follow one another in the direction of flow and are respectively denoted by 62 and 63. In this example, the group of louvres located furthest upstream, as seen in the direction of flow, is the group denoted by reference numeral 63. The louvres are positioned in such a manner that the stream 5 is intercepted by the louvres in order to be diverted to the other side of the fin, where the deflected stream is in turn intercepted once again, by the louvres belonging to group 62, in order to be returned at least approximately to their original path. This structure provides excellent heat transfer between the medium flowing past and the fins.

The water feed line 59 may be arranged to receive water from the funnel-like recesses 4 and water-passage openings 5. The nozzles 60 are preferably actuated so as to release water to the coated side, i.e. the fins 54-57 in the secondary medium stream II, intermittently. The watering system wets the hydrophilic and water-buffering covering layer. As far as possible, it is prevented from directly humidifying the secondary air stream, since this only has the effect of reducing the efficiency of the dew point cooler 50. Therefore, the use of sprinklers at this location is positively avoided in accordance with the invention. The evaporation takes place from the covering layer of the fins, which have been wetted by water, and the free wall parts of the walls 51, 52, 53 which may also be provided with a hydrophilic covering layer, i.e. the fin-free zones denoted by 58 and 58'.

In an alternative and preferred embodiment according to FIG. 8, a drip tray 66 comprising a matrix like array of recesses 68 is provided. As in the previous embodiments, the recesses are provided with small openings (not shown), by which drops may exit the drip tray 66. A cover 70 can be joined to the drip tray 66 to form a substantially sealed unit. In this embodiment, two rotating sprinklers 72 are supported by the cover 70 so that their outlets can provide a uniform distribution of water to the drip tray 66.

According to one aspect of the invention, it has been found that slight overwatering of the heat exchanging surface ensures that the wet wall, including the fins, is substantially homogenously irrigated and also contains water virtually everywhere. This means that the driving pressure difference for the evaporation is optimum throughout. An appropriate selection of the flow rate and the degree of turbulence ensure that a high efficiency is achieved. As mentioned above, this overwatering should preferably be intermittent, with the quantity of water or the watering sequence being controlled according to the required performance.

In the illustrative embodiments, the drop forming openings at the base of the recesses in the drop forming device have been shown as round openings. Other shapes of openings may also be used. In particular, it has been found that elongate slots are effective in allowing rapid delivery of substantially all the water supplied by the sprinklers ensuring abrupt termination of the delivery once the sprinklers are stopped. Slots having dimensions of about 3 mm by 16 mm have been found effective in combination with the depicted dew point cooler.

While the above examples illustrate preferred embodiments of the present invention it is noted that various other arrangements may also be considered which fall within the spirit and scope of the present invention as defined by the appended claims.

The invention claimed is:

1. An evaporative cooler comprising;
   a heat exchanger having a number of heat conducting walls that separate
   i) a primary air flow circuit on a first side of the heat exchanger; and
   ii) a secondary air flow circuit on a second side of the heat exchanger, which is thermally coupled to the primary air flow circuit via the number of at least partially heat-conducting walls of the heat exchanger, through which two circuits the separated air flows can flow in countercurrent and in heat exchange,
   which heat-conducting walls have a plurality of zigzag-shaped strips forming fins, on both sides, each fin having a plurality of perforations in the form of slots, the slots having a shape such that in use an air flow is successively deflected from one side of the fin to another side of the fin improving heat exchange between the air flow and the fin;
   the heat-conducting surfaces of the said walls and the fins, at least in the region of the secondary medium forming a wettable heat exchange surface for evaporation of an irrigation liquid, and being at least partially covered with a hydrophilic, covering layer, which covering layer can absorb an evaporable liquid, can retain this liquid and then release it again through evaporation, in such a manner that the moistened covering layer and as a result also the heat-conducting surfaces and the fins are cooled; and
   iii) an irrigation system, the irrigation system comprising:
   a spraying device for spraying the irrigation liquid over a plurality of drop forming openings in a drop forming device that forms part of a distribution area; the drop forming openings forming a plurality of drops from the distributed irrigation liquid and supplying the drops from the distribution area to the wettable heat exchange surface,
   wherein the distribution area is a substantially closed volume for substantially preventing egress of nebulized irrigation liquid, and the slots in the fins are configured such that in use irrigation liquid can pass therethrough to wet the fins located at a lower level.

2. The evaporative cooler according to claim 1, wherein the drop forming device comprises a tray having a plurality of openings.

3. The evaporative cooler according to claim 2, wherein the tray is provided with a plurality of recesses, the openings being located at the lowest points of the recesses.

4. The evaporative cooler according to claim 3, wherein the distribution area is located over the tray.

5. The evaporative cooler according to claim 1, wherein the evaporative cooler is a dewpoint cooler.

6. The evaporative cooler according to claim 1, wherein the spraying device comprises a rotary spray head.

7. The evaporative cooler according to claim 1, wherein the irrigation system further comprises a source of pressurized liquid in communication with the spraying device.

8. A method of wetting the heat exchange surface of the evaporative cooler of claim 1 with an evaporable liquid, comprising:
   supplying the liquid to the generally closed distribution area; and
   delivering the liquid from the distribution area to the heat exchange surface in an intermittent manner by delivering sufficient water to irrigate the wettable heat exchange surface and then ceasing delivery, substantially without nebulization, for evaporation of the liquid from the heat exchange surface.

9. The method according to claim 8, wherein the liquid is sprayed into the distribution area.

10. The method according to claim 9, wherein the liquid is delivered to the heat exchange surface from the distribution area from a plurality of recesses formed in the distribution area.

11. The method according to claim 9, wherein the intermittent delivery comprises an actuation period in which the liquid delivery to the heat exchange surface is abruptly started and stopped.

12. The method according to claim 11, wherein sufficient liquid is delivered in a single actuation period to substantially saturate the heat exchange surface.

13. The method according to claim 12, wherein excess liquid is collected below the heat exchange surface for reuse.

14. The method according to claim 8, wherein the evaporative cooler is a dewpoint cooler.

15. A method of operating the evaporative cooler of claim 1, the method comprising;
wetting the heat exchange surface with the irrigation liquid by supplying the liquid to the substantially closed distribution area, and delivering the liquid from the distribution area to the heat exchange surface in an intermittent manner substantially without nebulization; and
flowing a gas with a relative humidity of less than 100% over the wetted heat exchange surface to evaporate at least a portion of the liquid.

16. An evaporative cooler, comprising:
a primary air flow circuit and a secondary air flow circuit, which is thermally coupled to the primary air flow circuit via a number of at least partially heat-conducting, substantially vertical walls having top edges, through which two air flow circuits two separated air flows can flow in countercurrent, at least the secondary air flow containing air with a relative humidity of less than 100%;
which heat-conducting walls have a plurality of zigzag-shaped strips forming fins, on both sides, each fin having a plurality of perforations in the form of slots, the slots having a shape such that in use an air flow is successively deflected from one side of the fin to another side of the fin improving heat exchange between the air flow and the fin;
the heat-conducting surfaces of the said walls and the fins, at least in the region of the secondary air flow circuit, being at least partially covered with a hydrophilic, covering layer, which covering layer can absorb an evaporable liquid through capillary action, can retain this liquid and then release it again through evaporation, in such a manner that the moistened covering layer and as a result also the heat-conducting surfaces and the fins are cooled;
which covering layer consists of a porous, technical-grade ceramic material, a fired layer, a cement, a fibrous material, or a mineral wool;
primary drive means based on pressure difference for the primary air flow;
a housing with primary and secondary air flow inlets and outlets; and
an irrigation system, the irrigation system comprising:
a spraying device for distributing the irrigation liquid over a distribution area; and
a drop forming device for forming a plurality of drops from the distributed liquid and supplying the drops from the distribution area to the wettable heat exchange surface,
wherein the distribution area is a substantially closed volume for substantially preventing egress of nebulized irrigation liquid; and
wherein the irrigation system is arranged for subjecting the secondary medium to humidification by the evaporable liquid by evaporation of liquid from the covering layer, in such a manner that the evaporated liquid entrained by the secondary medium extracts heat from the primary medium via the heat-conducting walls; and
wherein the irrigation system comprises a removable cover which forms part of the casing and bears the spraying device which is positioned at a distance above the top edges of the walls for distributing water onto the covering layer on the walls and the fins, which spraying device receives pressurised water via at least one water feed line, and the slots in the fins are configured such that in use irrigation liquid can pass therethrough to wet the fins located at a lower level.

17. The evaporative cooler according to claim 16 wherein funnels are located in the regions between the top edges of adjacent walls, these funnels receiving the water received from the at least one spraying device and passing it on to the covering layer on the respective walls and the break-up elements.

18. The evaporative cooler according to claim 17, wherein the funnels are formed as moulded strips, each having a number of funnels, which may be releasably connected to opposite top edges of the heat-conducting walls.

19. The evaporative cooler according to claim 18, wherein each strip forms a monolithic unit with a wall or two adjacent walls.

20. The evaporative cooler according to claim 19, wherein the strips, and if appropriate the associated wall or walls consist of plastic and are formed by thermoforming, vacuum-forming or injection-moulding.

21. The evaporative cooler according to claim 16, comprising a number of spraying devices which are each connected to the at least one water feed line via an individual water feed line which is connected to each spraying device via a manifold.

22. The evaporative cooler according to claim 16, wherein the cover comprises two molded plates which are placed on top of one another and are connected to one another, which plates delimit a passage which forms the water feed line.

23. The evaporative cooler according to claim 16, wherein the housing comprises a base which has a discharge device for excess water.

* * * * *